United States Patent [19]

Sasaki et al.

[11] Patent Number: 4,840,733
[45] Date of Patent: Jun. 20, 1989

[54] FINE POROUS MEMBRANE AND PROCESS FOR PRODUCING THE SAME

[75] Inventors: Jun Sasaki; Atsushi Adachi; Kyoichi Naruo; Yukio Shinagawa; Sumio Ohtani, all of Kanagawa, Japan

[73] Assignee: Fuji Photo Film Co., Ltd., Kanagawa, Japan

[21] Appl. No.: 127,304

[22] Filed: Dec. 2, 1987

[30] Foreign Application Priority Data

Dec. 2, 1986 [JP] Japan .................. 61-285996
Dec. 2, 1986 [JP] Japan .................. 61-285997

[51] Int. Cl.$^4$ ............................................. B01D 13/00
[52] U.S. Cl. ................................ 210/500.41; 528/171
[58] Field of Search ............... 210/500.41; 528/171, 528/125, 172, 206, 208, 210, 211, 219, 271

[56] References Cited

U.S. PATENT DOCUMENTS 4,085,090 4/1978 Hara et al. ...................... 528/171
4,229,297 10/1980 Nohmi et al. .................... 210/654

Primary Examiner—Frank Sever
Attorney, Agent, or Firm—Sughrue, Mion, Zinn, Macpeak & Seas

[57] ABSTRACT

A fine porous membrane having a pore size distribution in the thickness direction and having a layer having a minimum pore size in the interior thereof, wherein the ratio of maximum pore size to the average pore size, each as determined according to ASTM-316-80, is not more than 1.8. The fine porous membrane is produced by a process comprising casting a film-forming solution, comprising a polymer in a solvent having incorporated therein a swelling agent and a non-solvent, on a casting carrier while being in a solution state, directing air having a temperature of from 15° to 60° C. and a relative humidity of from 10 to 80% onto the surface of the cast film at a velocity of from 0.2 to 4 m/sec for a period of from 2 to 17 seconds to cause coacervation of the cast film while controlling the evaporation loss of the solvent from the cast film and the absorption of non-solvent vapors in the air, dipping the case film in a coagulating bath to cause phase separation and coagulation to form a fine porous membrane, and stripping off the membrane from the casting carrier. The fine porous membranes has a low filtration resistance, a great filtration flow rate, a high efficiency in trapping fine particles and bacteria, and a long life.

6 Claims, 2 Drawing Sheets

FINE POROUS MEMBRANE AND PROCESS FOR PRODUCING THE SAME

FIELD OF THE INVENTION

This invention relates to a fine porous filter membrane and a process for producing the same. More particularly, it relates to a fine porous membrane for precise filtration capable of efficiently removing fine particles or microorganisms having sizes of 10 $\mu$m or less, and particularly on the order of submicrons, which is useful in the production of pharmaceuticals or foods, in the electronics industry requiring minute processing, such as production of semi-conductors, preparation of ultrapure water to be used in laboratories in various industries, preparation of purified water or pure water to be used in production, and other precise filtration needs, and a process for producing such a fine porous membrane.

BACKGROUND OF THE INVENTION

Conventionally known fine porous membranes for precise filtration used in the pharmaceutical industry, food industry, and electronics industry, include those made of cellulose esters, aliphatic polyamides, polyfluorocarbon, polysulfone, polypropylene, etc. as disclosed, e.g., in Japanese Patent Publication No. 40050/73 and Japanese Patent Application (OPI) Nos. 37842/83, 91732/83, and 154051/81 (the term "OPI" as used herein means "unexamined published Japanese patent application").

These conventional fine porous membranes are classified into two large groups, one of which is called a symmetric membrane in which the inside pores have a substantially unchanged diameter throughout the thickness direction so that the pores on both sides thereof have substantially the same diameter. The other is called an asymmetric membrane in which the pore diameter changes continuously or discontinuously in the thickness direction so that the pore diameter on one side thereof is different from that on the other side.

As described in Japanese Patent Application (OPI) No. 9801/83, the symmetric membrane has a large resistance, as a whole, to a liquid stream to be filtered. As a result, it has a small flow rate, i.e., the flow rate per unit area per unit time per unit differential pressure is small. In addition, it is easily clogged, has a short working life, and lacks anti-blocking properties.

On the other hand, the asymmetric membrane contains a so-called dense layer having small pores on one side of the membrane and relatively large pores on the other side as described in Japanese Patent Publication No. 6406/80 and Japanese Patent Application (OPI) No. 154051/81. Since the smallest of the particles to be filtered out can be substantially trapped by the dense layer, the entire thickness of the membrane can be effectively used as a filter medium. Therefore, if care is taken on use, it is possible to increase the flow rate or increase the life of the membrane. From this viewpoint, the asymmetric membrane has excellent performance as a fine porous filter membrane.

However, in spite of the extreme importance of the dense layer, because the conventional dense layer is present on the surface, it easily receives scratches, which leads to leakage of fine particles.

In order to overcome such a disadvantage, studies have been directed to a filter membrane having a dense layer, i.e., a layer having small pores, in the interior thereof. For example, Japanese Patent Application (OPI) No. 150402/83 proposed a discontinuous structure composed of two asymmetric membranes with each of the dense layers thereof being intimately contacted together. However, when such a filter system composed of two asymmetric membranes is placed in a cartridge in a fold, the filter area in the cartridge becomes small which reduces the flow rate as a module. For this reason, it has been keenly desired in the art to develop a filter medium composed of a single membrane containing a dense layer in the interior thereof.

Aiming at a solution of the above-described problems, a dry wet process, one of the processes for producing fine porous membranes, which comprises casting a polymer stock solution and allowing the cast film in air for a given period of time to cause microphase separation while controlling the pore size thus formed was extensively investigated. As a result, it was surprisingly discovered that a layer having the minimum pore size can be formed in a fine porous membrane in the interior along the direction perpendicular to its surface by properly controlling the evaporation loss of the solvent and the absorption of a non-solvent vapor as disclosed in Japanese Patent Application (OPI) No. 27006/87. This technique is unlike the method which includes sufficient evaporation of the solvent as disclosed, e.g., in Japanese Patent Application (OPI) No. 102416/80 or the method which includes dipping a film in a coagulating bath without substantial evaporation of the solvent as disclosed, e.g., in Japanese Patent Application (OPI) Nos. 8887/80 and 154051/81.

SUMMARY OF THE INVENTION

The present invention relates to an improvement on the above-described fine porous membrane, and particularly to a fine porous membrane exhibiting excellent performance and to a process for producing the same.

Accordingly, one object of this invention is to provide a fine porous membrane having a reduced resistance to a liquid flow and an increased filtration flow rate and a process for producing the same.

Another object of this invention is to provide a fine porous membrane which hardly undergoes deterioration of its filtration performance even when its surface is damaged due to scratches, and the like and a process for producing the same.

A further object of this invention is to provide a fine porous membrane capable of efficiently trapping fine particles, bacteria, etc. and has an extended life and a process for producing the same.

Considering that the maximum pore size of the dense layer is preferably controlled so as to not be too large with respect to the average particle size so as to make the leaking particle size as small as possible, it has been noted that the internal dense layer serves to control the maximum pore size below double the average pore size with a narrow pore size distribution. For reference, the commercially available membranes have their maximum pore size larger than double the average pore size.

The above objects of the present invention have been met by a fine porous membrane having a pore size distribution along the thickness direction and having a minimum pore size layer in the interior thereof, in which the maximum pore size is not greater than 1.8 times the average pore size as measured according to ASTM-316-80. According to this measurement method, the maximum pore size and the average pore size can be determined.

The fine porous membrane according to the present invention can be produced by a process comprising casting a film-forming stock solution prepared by dissolving a polymer and, if desired, a swelling agent and a non-solvent in a solvent on a casting carrier, directing air having a temperature of from 15° to 60° C. and a relative humidity of from 10 to 80% to the surface of the cast film at a velocity of from 0.2 to 4 m/sec for a period of from 2 to 17 seconds to cause coacervation while controlling evaporation of the solvent from the film and absorption of moisture from the air, dipping the cast film in a coagulating bath to cause phase separation and coagulation, and peeling the thus formed fine porous membrane from the carrier.

DETAILED DESCRIPTION OF THE INVENTION

An embodiment of the process for producing the fine porous membrane according to the present invention will be illustrated with reference to FIG. 3.

Figure 3:
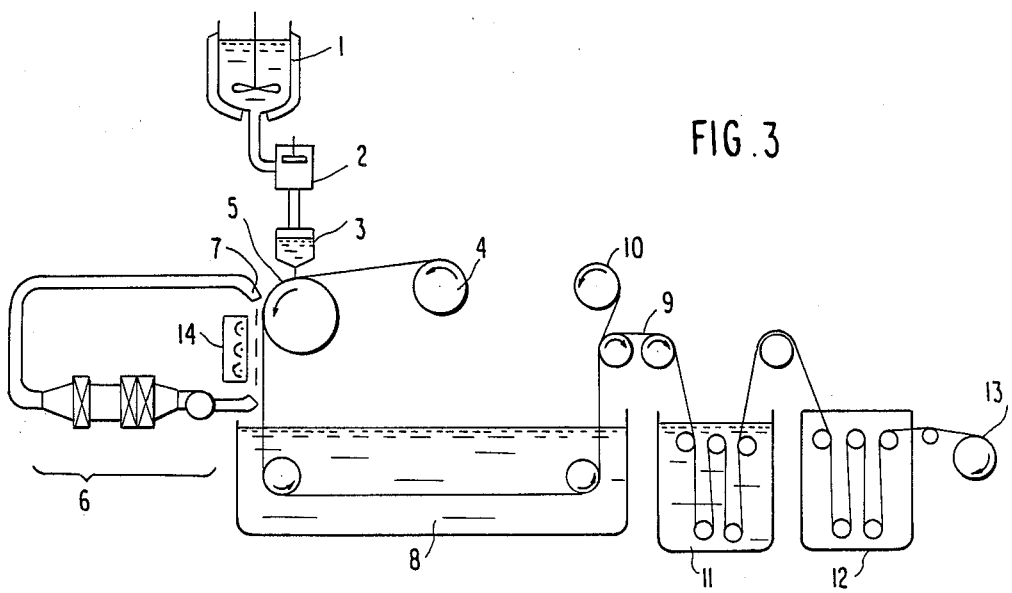
FIG. 3 is a diagram illustrating one embodiment of the process for producing the fine porous membrane according to the present invention.

In FIG. 3, a polymer is dissolved in a solvent in jacketed dissolver 1. At this time, a non-solvent, a swelling agent, and the like necessary for formation of fine pores are added to the solution. After defoaming, the polymer solution is forwarded to caster 3 through pump 2, and the caster liquid in a stable solution state is cast on carrier 4 made of a polyester film or a polystyrene film to form cast film 5. Blowin air having a temperature of from 15° to 60° C. and a relative humidity of from 10 to 80% in airconditioning apparatus 6 is fed from outlet 7 and directed to the surface of the cast film at a velocity of from 0.2 to 4 m/sec for a period of from 2 to 17 seconds. The cast film is then dipped in coagulating bath 8 containing a liquid which is a non-solvent for the polymer and is compatible with the solvent of the polymer.

Upon being blown with the conditioned air and, at the same time, being radiated with infrared light radiation panel 14, film 5 undergoes coacervation from its surface toward the inside to thereby form a fine coacervation phase from the surface toward the inside. When dipped in coagulating bath 8, the coacervation phase is fixed as fine pores and, at the same time, pores other than the fine pores are formed by phase separation of cast film 5 to thereby form fine porous membrane 9, which is then stripped off from carrier 4.

Casting carrier 4 is wound up around winder 10, while stripped fine porous membrane 9 is introduced into washing tank 11 and drier 12 and finally wound around winder 13.

According to the above-described process, a fine porous membrane having a desired average pore size can be obtained with the ratio of its maximum pore size to the average pore size being controlled not to exceed 1.8 by varying the time of air blowing.

The film-forming polymer which can be used in this invention is not particularly limited and may be selected depending on the end use of the resulting porous membrane or any other requirement. Examples of usable polymers include cellulose acetate, nitrocellulose, polysulfone, sulfonated polysulfone, polyether sulfone, polyacrylonitrile, a styrene-acrylonitrile copolymer, a styrene-butadiene copolymer, a saponified ethylene-vinyl acetate copolymer, polyvinyl alcohol, polycarbonate, an organosiloxane-polycarbonate copolymer, polyester carbonate, organopolysiloxane, polyphenylene oxide, polyamide, polyimide, polyamideimide, polybenzimidazole, etc.

Of these polymers, preferred is polysulfone, polyether sulfone, or a mixture thereof. In particular, polymers having a repeating unit represented by formula:

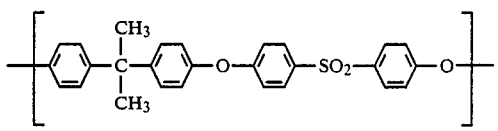

or a repeating unit represented by formula:

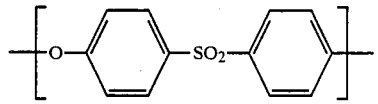

are more preferred.

The fine porous membrane according to the present invention can be produced by casting a solution of the aforesaid film-forming polymer on a casting carrier, and dipping the cast film in a coagulating bath, followed by washing and drying.

The polymer solution is prepared by dissolving the polymer in (i) a solvent, (ii) a mixture of a solvent and a non-solvent, or (iii) a mixture of plural kinds of solvents different in dissolving power for the polymer. The solvent for the film-forming polymer is usually selected from among those which are solvents for the film-forming polymer and may be rapidly displaced with a coagulating solution when dipped in a coagulating bath, though depending on the kind of the polymer used or the like factor. Since, in many cases, the coagulating solution comprises water and/or a water-compatible organic solvent, the solvent for the polymer is preferably selected from polar solvents having compatibility with such a coagulating solution. For instance, suitable solvents for polysulfone include dioxane, tetrahydrofuran, dimethylformamide, dimethylacetamide, N-methyl-2-pyrrolidone, and mixture thereof. Suitable solvents for polyacrylonitrile include dioxane, N-methyl-2-pyrrolidone, dimethylformamide, dimethylacetamide, dimethyl sulfoxide, etc. Those for polyamide are dimethylformamide, dimethylacetamide, etc., and those for cellulose acetate are acetone, dioxane, tetrahydrofuran, N-methyl-2-pyrrolidone, etc.

The non-solvent, if used, includes water, cellosolves, methanol, propanol, acetone, tetrahydrofuran, polyethylene glycol, glycerin, etc.

The proportion of the non-solvent to the solvent is arbitrarily selected as long as the mixed solvent may keep a uniform solution state, and preferably from a range of from 1 to 50% by weight, more preferably 1 to 20% by weight.

For the purpose of regulating the pore structure, an organic or inorganic electrolyte or a high polymer or an electrolyte thereof is added to the polymer solution as a swelling agent. Specific examples of such a swelling agent include metal salts of inorganic acids, e.g., sodium chloride, lithium chloride, sodium nitrate, potassium nitrate, sodium sulfate, zinc chloride, etc.; high polymers, e.g., polyethylene glycol, polyvinylpyrrolidone, etc.; high polymeric electrolytes, e.g., sodium polystyrenesulfonate, polyvinylbenzyltrimethylammonium chloride, etc.; ionic surface active agents, e.g., sodium dioctylsulfosuccinate, sodium alkylmethyltaurines, etc.; and the like. Some effects may be produced by adding these swelling agents alone, but the effects of addition can be particularly pronounced when these swelling agents are added in the form of an aqueous solution. The amount of the aqueous solution of the swelling agent to be added is not particularly limited as far as the uniformity of the polymer solution can be maintained and is usually selected from a range of from 0.5 to 10%, preferably 1 to 5%, by volume based on the solvent. The concentration of the aqueous solution is also unlimited. The higher the concentration, the greater the effects attained. In general, the aqueous solution to be added has a concentration of from 1 to 60%, preferably 5 to 30%, by weight.

The concentration of the polymer solution as a casting liquid ranges from 5 to 35% by weight, and preferably from 10 to 30% by weight. If it exceeds 35% by weight, the water permeability of the resulting fine porous membrane becomes too low to have any practical significance. If it is less than 5% by weight, a fine porous membrane having a sufficient separating capacity is not obtained.

The process for producing a fine porous membrane according to the present invention is technically characterized by appropriate control of both the evaporation loss of the solvent and the absorption of non-solvent vapors from the surrounding atmosphere (e.g., moisture absorption) through application of blowing air onto the surface of a cast film on a carrier at a velocity of from 0.2 to 4 m/sec for a period of from 2 to 17 seconds. The blowing air is conditioned so as to have a temperature of from 15° to 60° C., preferably 15° to 40° C., and a relative humidity of from 10 to 80%, preferably 20 to 60%. For example, when air having a temperature of 25° C. and an absolute humidity of water or methanol at least 2 g/Kg-air is directed onto the cast film at a velocity of 0.2 m/sec, the cast film undergoes coacervation to form a coacervation phase from the outermost layer into the depth of 1 μm or more, and preferably from 1 to 30 μm. Immediately thereafter, the film is dipped in a coagulating bath to form a porous membrane. The thus obtained membrane contains a minimum pore size layer in the portion corresponding to the deepest portion of the coacervation phase.

The membrane of the present invention has a pore size on its back side about 10 to 1000 times greater than that on the surface side and a specific surface area of at least 8 m²/g, preferably from 8 to 80 m²/g, and more preferably from 20 to 60 m²/g, as measured by a BET method. If the specific surface area is more than 80 m²/g, the mechanical strength of the membrane decreases below an acceptable level for practical use. The reason for the formation of the minimum pore size layer is not clear, but an assumption can be made as follows.

It is believed that the minimum pore size layer be formed in the interface between a layer in which microphase separation has occurred due to evaporation of the solvent and entry of the nonsolvent and a layer where such microphase separation has not occurred. The minimum pore size layer can be fixed by dipping the film in a coagulating bath before the pore of the minimum pore size layer grows. Then, a coagulating solution is passed through the minimum pore size layer into the inside of the cast film at a mild rate, and microphase separation proceeds in the inside of the minimum pore size layer (toward the back side) due to the entry of the non-solvent toward the back side to thereby form fine pores having a size larger than that of the minimum pore size layer in the inside of the minimum pore size layer (toward the back side).

For the purpose of opening the pores on the surface of membranes for precise filtration, conventional processes for producing porous membranes comprising casting a polymer liquid having undergone slight phase separation on a carrier and then dipping the cast film in a coagulating solution as taught in Japanese Patent Application (OPI) Nos. 154051/81 and 145740/83 have been employed.

The most serious problem of these conventional processes lies in that the processes further require a filtration step, as described in Japanese Patent Application (OPI) No. 145740/83, because the stock polymer solution suffers precipitation due to extremel poor stability under a phase-separated state unless the solution is cast within a short period of time after the preparation thereof. On the other hand, if the phase separation is suppressed in order to maintain the stability of the stock solution, a skin layer is formed on the surface of the membrane. This results in a failure to assure performance as a medium for precise filtration.

The above-described disadvantage can be eliminated by preparing a stock polymer solution as a completely homogeneous system and allowing the cast film to absorb non-solvent vapors, for example, a moisture content, of the air while evaporating the solvent from the film during the period of time from the casting through dipping in a coagulating bath to thereby produce a phase separation state only in the vicinity of the surface of the film.

In other words, the present invention makes it possible to produce an asymmetric membrane having a dense layer in the interior thereof, that has never been realized by the conventional processes, through control of the temperature of the air in contact with the surface of the cast film, the quantity of non-solvent vapors in the air (the relative humidity in the case of water vapor), and the velocity of the blowing air. According to the present invention, in order to induce phase separation only in the vicinity of the surface layer, it is necessary that the cast film should uniformly absorb the non-solvent vapor in a very short period of time and, immediately thereafter, be coagulated. The depth and pore size of the dense layer can be adjusted by controlling the absorption of the non-solvent vapor.

For the purpose of ensuring the effects of the present invention, it is particularly required to previously incorporate not only the solvent for the polymer but a non-solvent, a swelling agent, and the like into the stock polymer solution. Examples of the non-solvent and swelling agent include water, polyethylene glycol, polyvinylpyrrolidone, etc. as described above.

The above-described conditions in the process of the present invention vary depending on the kind of the polymer, solvent, non-solvent, and swelling agent, the polymer concentration, the atmosphere during casting, and the like. Therefore, the optimum conditions should be predetermined by studying the time required for phase separation and the structure of the resulting membrane. Th predetermined conditions can be maintained by controlling the evaporation loss of the solvent from the cast film and the absorption of the non-solvent vapor by various methods. Such methods include control of the time from the casting up to the dipping in a coagulating bath by putting a cover over the line from the casting section to the coagulation section and control of the atmosphere in that line in terms of solvent vapor pressure, non-solvent vapor pressure, temperature, and velocity of the air for blowing and exhaustion, etc.

The cast film taken out of the coagulating bath has self-supporting properties and is released from the carrier having served for reinforcement and then dipped in a washing bath of water which may contain a surface active agent and/or a lower alcohol such as methanol, ethanol, etc. for increasing the efficiency of waterwashing. After washing with water, the film is dried and wound around a winder or subjected to after-treatments, such as a treatment for rendering the film hydrophilic, for example, by coating a hydrophilic polymer as disclosed in U.S. Pat. No. 2,081,604, graft-polymerizing with a hydrophilic monomer as disclosed in U.S. Pat. No. 4,340,482, or subjecting the film to a plasma treatment as disclosed in Japanese Patent Application (OPI) No. 186604/84, etc. There is thus obtained a filter membrane having fine pores in the interior thereof and relatively large pores on both sides thereof.

The present invention will now be illustrated in greater detail with reference to the following examples, but it should be understood that the present invention is not deemed to be limited thereto. In these examples, all the parts are by weight unless otherwise indicated.

EXAMPLES 1 TO 4 AND COMPARATIVE EXAMPLES 1 AND 2

Fifteen parts of polysulfone ("P-3500" produced by UCC), 70 parts of N-methyl-2-pyrrolidone, 15 parts of polyvinylpyrrolidone, 2 parts of lithium chloride, and 1.6 parts of water were uniformly mixed to prepare a film-forming stock solution. The solution, being in a stable state, was cast on a glass plate by means of a doctor blade to a thickness of 180 μm on a dry basis, and air having a temperature of 25° C. and a relative humidity of 50% was blown at a velocity of 1.0 m/sec and directed to the surface of the cast film for a varied period of from 2 to 30 seconds. Immediately thereafter, the film was dipped in a coagulating bath filled with water at 25° C. to obtain a fine porous membrane having a dense layer in the interior thereof.

The average pore size of each of the resulting membranes was determined according to ASTM-316-80, and the depth of the dense layer form the surface was measured with an electron microscope. The results obtained are shown in Table 1 below.

TABLE 1

| Example No. | Time of Air Blowing (sec) | Average Pore Size (μm) | Depth of Dense Layer (μm) |
| --- | --- | --- | --- |
| Example 1 | 2 | 0.2 | 1 |
| Example 2 | 6 | 0.5 | 14 |
| Example 3 | 10 | 1.9 | 20 |
| Example 4 | 14 | 4.2 | 40 |
| Comparative Example 1 | 18 | 20.8 | 80 |
| Comparative Example 2 | 30 | coarse pores | unclear |

The results of Table 1 show that the average pore size of the membrane and the depth of the dense layer can be varied by controlling the time of applying the conditioned air. When the time of air blowing was 18 seconds or more, the resulting membranes had coarse pores as shown in the Comparative Examples.

EXAMPLES 5 TO 8 AND COMPARATIVE EXAMPLES 3 AND 4

Twenty parts of polyvinylidene fluoride ("Kyner" produced by Penwalt Co., U.S.A.), 60 parts of dimethylacetamide, 5 parts of methanol, 10 parts of polyvinylpyrrolidone, and 0.2 part of water were mixed to prepare a uniform solution. The solution in a stable state was cast on a glass plate by means of a doctor blade to a thickness of 180 μm on a dry basis. Air having a temperature of 60° C. and a relative humidity of 40% was blown and directed to the surface of the cast film at a velocity of 1.2 m/sec for a period of 0, 4, 8, 10 or 20 seconds, and the film was then dipped in a coagulating bath comprising ethanol and water at a volume ratio of 1:1 to obtain a fine porous membrane having a dense layer in the interior thereof.

The average pore size and the depth of the dense layer in each membrane as determined in the same manner as in Example 1 are shown in Table 2.

TABLE 2

| Example No. | Time of Air Blowing (sec) | Average Pore Size (μm) | Depth of Dense Layer (μm) |
| --- | --- | --- | --- |
| Comparative Example 3 | 0 | ≦0.1 | 1 |
| Example 5 | 4 | 0.3 | 20 |
| Example 6 | 8 | 0.8 | 40 |
| Example 7 | 10 | 1.5 | 90 |
| Example 8 | 15 | 3.6 | 120 |
| Comparative Example 4 | 20 | coarse pores | unclear |

As can be seen from Table 2, when air blowing to the cast film was not carried out (Comparative Example 3), the dense layer was formed in a shallow portion so that it was not protected against abrasion of the the membrane. Further, it is apparent that an air blowing time of 20 seconds (Comparative Example 4) resulted in formation of coarse pores, and thus in the failure to produce a filter membrane serving for precise filtration.

EXAMPLES 9 TO 12 AND COMPARATIVE EXAMPLE 5

Fifteen parts of polysulfone ("P-3500"), 70 parts of N-methyl-2-pyrrolidone, 15 parts of polyvinylpyrrolidone, and 3 parts of water were mixed to prepare a uniform filmforming stock solution. The solution in a stable state was cast on a glass plate by means of a casting coater to a film thickness of 180 μm on a dry basis. Air having a temperature of 25° C. and a relative humidity of 40% was directed to the surface of the cast film at a velocity of 1.2 m/sec for a varied time. Immediately thereafter, the film was dipped in a coagulating bath filled with water at 25° C. to obtain a fine porous membrane.

The characteristics of the resulting membranes as determined in the same manner as in Example 1 are shown in Table 3.

TABLE 3

| Example No. | Time of Air Blowing (sec) | Depth of Dense Layer ($\mu$m) | Average Pore Size ($\mu$m) | Maximum Pore Size ($\mu$m) |
| --- | --- | --- | --- | --- |
| Comparative Example 5 | 0 | outermost surface | 0.1 | 0.17 |
| Example 9 | 4 | 8 | 0.15 | 0.24 |
| Example 10 | 8 | 12 | 0.2 | 0.34 |
| Example 11 | 10 | 18 | 0.5 | 0.85 |
| Example 12 | 15 | 30 | 0.8 | 1.40 |

It can be seen that each membrane prepared using the process of the present invention has a maximum pore size not greater than 1.8 times the respective average pore size.

EXAMPLE 13 AND COMPARATIVE EXAMPLE 6

The average pore size and the maximum pore size of a commercially available asymmetric polysulfone membrane having a dense layer on its surface were measured. The maximum pore size was found to be about 3.6 times the average pore size (Comparative Example 6).

Figure 1:
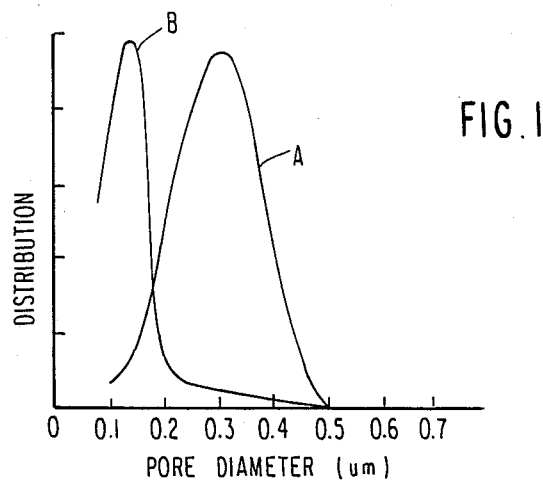
FIG. 1 is a graph of the pore size distribution of the fine porous membrane according to the present invention (A) and a commercially available asymmetric membrane (B).

A porous membrane was produced in the same manner as in Examples 9 to 12, except that the time of air blowing was set at 8.6 seconds so that the resulting membrane might have the same maximum pore size as the above-described commercially available polysulfone membrane (Example 13). The pore size distribution of the resulting membrane was compared with that of the membrane of Comparative Example 6, and the results are shown in FIG. 1.

Comparing these two membranes in water permeation, although both of them were found capable of removing particles of 0.5 $\mu$m or greater, the commercially available polysulfone membrane had a rate of water permeation of 30 ml/cm$^2$/min/atm, while the membrane of Example 13 showed markedly superior water permeability, i.e., a rate of water permeation of 80 ml/dm$^2$/min/atm. This clearly demonstrates the characteristics of the fine porous membrane according to the present invention.

COMPARATIVE EXAMPLES 7 AND 8

Figure 2:
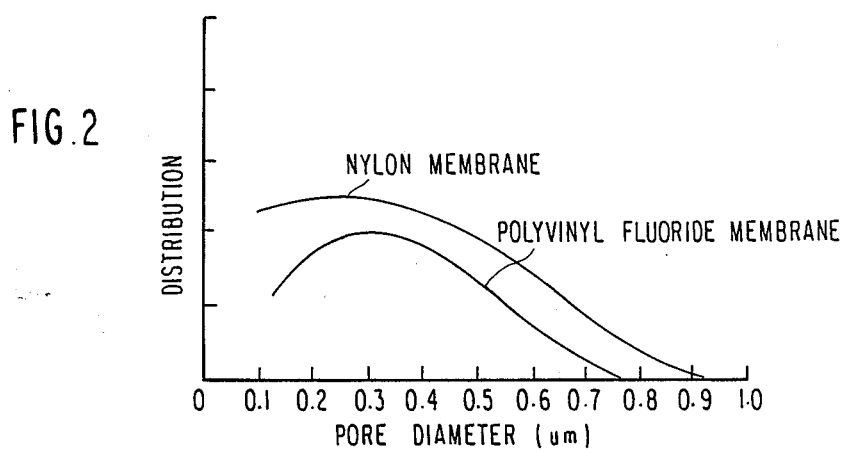
FIG. 2 is a graph of the pore size distribution of conventional symmetric membranes.

The pore size distribution of a commercially available symmetric membrane made of polyvinylidene fluoride or nylon as determined according to ASTM-316-80 is shown in FIG. 2. It can be seen from FIG. 2 that the ratio of the maximum pore size to the average pore size of the nylon membrane or the polyvinylidene fluoride membrane was 3.8 or 2.7, respectively, i.e., significantly greater than the corresponding value of the membrane of Example 9.

As described above, in fine porous membranes having a pore size distribution in the thickness direction and having a minimum pore size layer in the interior thereof, the improvement comprising controlling the ratio of the maximum pore size to average pore size to not exceed 1.8 provides fine porous membranes having lower filtration resistance, greater filtration flow rate, higher efficiency in trapping fine particles and bacteria, and longer life.

Furthermore, since the minimum pore size layer exists not on the surface but in the interior of the membrane, it is protected against damage due t.o scratches, etc. Thus, the membrane of the present invention is extremely advantageous not only on handling but for use as a cartridge type filter similarly to generally used single porous membranes.

While the invention has been described in detail and with reference to specific embodiments thereof, it will be apparent to one skilled in the art that various changes and modifications can be made therein without departing from the spirit and scope thereof.

What is claimed is:

1. A fine porous membrane, comprising:
    a polymer film having a top and a bottom surface defining an interior;
    a plurality of pores distributed in said film in a thickness direction; and
    a dense layer comprising a plurality of pores of minimum pore size located within said interior space,
    means providing a ratio of the maximum pore size of the pores in the dense layer to the average pore size of the pores in the dense layer, of not more than 1.8,
    and means providing a pore size of the pores located at the bottom surface of the film of 10 to 1,000 times greater than the pore size of the pores located at the top surface of the film.

2. The fine porous membrane as claimed in claim 1, wherein the membrane has a specifice surface area of from 8 to 80 m$^2$/g.

3. The fine porous membrane as claimed in claim 1, wherein the membrane has a specific surface area of from 20 to 60 m$^2$/g.

4. A fine porous membrane according to claim 1, wherein the depth of the dense layer from the top surface of the film is at least 1 $\mu$m.

5. a fine porous membrane according to claim 4, wherein the depth of the dense layer from the top surface of the film is from 1 $\mu$m to 30 $\mu$m.

6. A fine porous membrane according to claim 1, wherein said polymer is selected from the group consisting of polysulfone and polyether sulfone.

* * * * *